United States Patent [19]

Kaminski et al.

[11] Patent Number: 5,452,308
[45] Date of Patent: Sep. 19, 1995

[54] METHOD FOR MONITORING SYMMETRICAL TWO-WIRE BUS LINES AND TWO-WIRE BUS INTERFACES AND DEVICE FOR CARRYING OUT THE METHOD

[75] Inventors: Detlef Kaminski, Kornwestheim; Thilo Kühner, Remseck; Wolfgang Kremer, Mammendorf; Bernd Häussler, Ostfildern; Max Reeb, Uhingen; Rolf Adomat, Friedrichshafen; Michael Brodersen, Elmshorn; Alexander Dörr; Herbert Fiessinger, Meckenbeuren, all of Germany

[73] Assignee: Mercedes-Benz AG, Stuttgart, Germany

[21] Appl. No.: 43,487

[22] Filed: Apr. 6, 1993

[30] Foreign Application Priority Data

Apr. 7, 1992 [DE] Germany .................. 42 11 579.5

[51] Int. Cl.[6] ............................................. G06F 11/00
[52] U.S. Cl. ............................. 371/20.1; 395/183.19; 395/280
[58] Field of Search ............... 371/20.1, 15.1, 29.5, 371/68.2, 63, 61; 324/73.1, 158 R; 370/13, 14, 15, 16, 17; 375/10; 379/2; 395/527, 575, 550

[56] References Cited

U.S. PATENT DOCUMENTS

| | | | |
|---|---|---|---|
| 3,530,284 | 9/1970 | Wood | 235/153 |
| 4,088,876 | 5/1978 | Rege | 235/312 |
| 4,255,809 | 3/1981 | Hillman | 371/58 |
| 4,328,583 | 5/1982 | Stodola | 371/57 |

FOREIGN PATENT DOCUMENTS 3807418 9/1989 Germany .

*Primary Examiner*—Robert W. Beausoliel, Jr.
*Assistant Examiner*—Phung My Chung
*Attorney, Agent, or Firm*—Evenson, McKeown, Edwards & Lenahan

[57] ABSTRACT

A method for monitoring symmetrical two-wire bus lines and two-wire bus interfaces and a device for carrying out the method provides pulse weighting of low to high transitions or high to low transitions of the two wires operated in phase opposition of a two-wire bus line. The pulse chains thus obtained are used for step sequencing. In each case, one multistep shift function which is assigned to the first bus wire, is supplied with a first, constant logic read in state and can be reset to a second logic state in all-step fashion and, for all-step resetting of a similar second multistep shift function assigned to the second bus while, and vice versa, the step last achieved for each multistep shift function characterizing the respective fault state of the other bus wire. The pulse weighting is achieved by differentiation or high-pass filtering or by pulse generation controlled by state transition. For the pulse weighting, the device uses simple RC elements or edge-controlled monostable times, and for the multistep shift functions, two similar shift registers are used which can be loaded serially and clocked and reset in parallel and which can also be realized in one piece as a component of a monolithic semiconductor circuit by the previously mentioned elements. The device has a fault tolerance which can be programmed with respect to the bit width, and in conjunction with a likewise settable input cutoff frequency permits the decentralized local testing of two wire bus-type networks. The device can be made using CMOS technology, in conjunction with a very low space requirement.

17 Claims, 5 Drawing Sheets

METHOD FOR MONITORING SYMMETRICAL TWO-WIRE BUS LINES AND TWO-WIRE BUS INTERFACES AND DEVICE FOR CARRYING OUT THE METHOD

BACKGROUND AND SUMMARY OF THE INVENTION

The invention relates to a method and apparatus for monitoring symmetrical two-wire bus lines and two-wire bus interfaces where the two line wires change polarity in phase opposition.

Serial bus systems are known, for example, in German Patent DE 3,807,418 A1, wherein various aspects of interference immunity are discussed in conjunction with a low cost system design and circuitry. Symmetrical two-wire bus lines and symmetrical interfaces or bus drivers are widely applied in the transmission of digital information in serial fashion. The binary data are transmitted via, for example, intertwisted line wires. The wires can be driven in phase opposition.

Various methods are applied to test the fault-free availability of such lines and of the line drivers driving them, as well as of the line receivers connected thereto. For example, test bits can be inserted into the messages to be transmitted. Devices connected to the bus check the operability of the bus line or the transmitting interface by verifying the correct reception of the test bits. Alternatively, test messages can be sent at a predetermined time interval via the busline. Devices connected to the bus check whether the test messages are received within the system-specific fixed time interval. If the messages are not received, there is a defect in the bus system. Alternatively, an electronic monitoring system can be used to monitor the potential difference between the wires of such a bus line or the potential of the line wires and to test the extent to which corresponding voltage values are situated outside the state change times within defined tolerance windows. The relatively high cost of hardware and software is disadvantageous in these solutions.

U.S. Pat. No. 4,255,809 describes a device in which a rotary movement is detected by two sensors which read a moving mark. The two sensors have a certain offset with respect to one another. The two sensor signals feed two counters whose higher-order outputs are compared with one another. Due to the temporal offset of the sensor signals, the counter readings can be offset with respect to one another. However, in the absence of a mechanical or electrical fault, the higher-order outputs are equal to one another for the preponderant part of the time. This state is evaluated as "fault-free".

It is an object of the invention to provide a method for monitoring symmetrical two-wire bus lines and two-wire bus interfaces, as well as a device for carrying out the method, which manage with a relatively low cost of hardware and software and function independently of voltage potential differences such as, for example, a ground potential offset between individual bus subscribers.

This and other objects are achieved in accordance with the invention wherein the antiphase signals on the two wires of the bus line or on the two bus terminals of the two-wire bus interface are pulse weighted separately with respect to a defined state transition. The pulse chains obtained therefrom are each used for step sequencing an all-step resettable, multistep shift function which is assigned to each of the bus wires and can be serially loaded with a fixed logic level, and the corresponding pulse chains derived analogously from the other bus wire being used for the all-step resetting of the multistep shift function, the procedure being the reverse with respect to a multistep shift function assigned to the other of the bus wires. The logic state of the respectively last-reached step state of a multistep shift function then characterizes the most recent fault state of the other bus wire which can still be detected. According further to the present invention, the pulse weighting can be performed by differentiation, high-pass filtering, or by pulse generation control according to state transition. The edge-triggered generation of corresponding pulses offers the advantage that it is possible to achieve independence from the transmission speed on the bus before and after the occurrence of a fault.

Optimizing or matching the fault tolerance or the possible bit frequency and/or edge steepness can occur if after the detection of a bus fault has been performed, the testing of two-wire buses is rendered possible.

According to the present invention, a device has two high-pass filters, coupled to the bus line or to the two bus terminals of the two-wire bus interface, for differentiating the bus line signals, as well as two shift registers for realizing multistep shift functions. The shift registers each have a serial data input as well a clock input, acting in parallel, and a reset input, acting in parallel, and a serial data output. Depending on the logic type, the data inputs of the two registers can be, for example, permanently connected to the logic level "H". The clock input of each shift register is driven in each case by the output of the high-pass filter assigned to the same bus wire, and the reset input of each shift register is driven in each case by the output of the high-pass filter assigned to the other bus wire. In the event of a fault free bus state, a pulse from a specific state change on one bus wire resets to its complement a logic level clocked in by corresponding state changes on the other bus wire, so that, for example, the logic level "H" can appear at the output of a shift register only in the event of interference and of a consequently absent resetting of the shift register, and that the other bus wire is therefore identified in each case as a fault source. It is advantageous, on the one hand, that the hardware cost of this device is very low, since said filters can be realized as simple RC elements. Furthermore, it is advantageous, on the other hand, that the fault signals are present statically, so that their interrogation and evaluation by means of microprocessors can be performed at any desired points in time and consequently with a conceivably low software cost.

According further to the present invention, it is possible with respect to the shift registers provided according to the invention to have recourse to single-piece, integrated logic circuits, so that as a whole the monitoring device can be realized in a very space-saving and cost-effective fashion. The topographies of a plurality of shift registers consideration are available as silicon compilable standard cells, and corresponding RC filters manage with very low capacitances or can be replaced by likewise silicon-compilable, edge-triggered monostable multivibrators or timing structures, the device according to the invention can also be co-integrated using highly reliable technology on-chip with monolithic bus circuits, in conjunction with a very low cost outlay.

Because of a bus fault tolerance and/or cutoff frequency that can be influenced or selected, a device developed according to the invention is suitable as a universal, silicon-compilable standard cell for monitoring symmetrical two-wire bus lines and two wire bus interfaces. Due to the possibility of defined variation in the duration of individual pulses generated in the course of the pulse weighting as control pulses for the shift registers and/or of defined variation in the bit length of the fault tolerance, an appropriately developed device also permits testing of a two-wire bus which is suspected of having interference, specifically with or without the use of a special bus test signal.

BRIEF DESCRIPTION OF THE DRAWINGS

FIG. 1b shows a corresponding component-level block diagram on the of the device from FIG. 1a;

DETAILED DESCRIPTION OF THE DRAWINGS

Figure 1A:
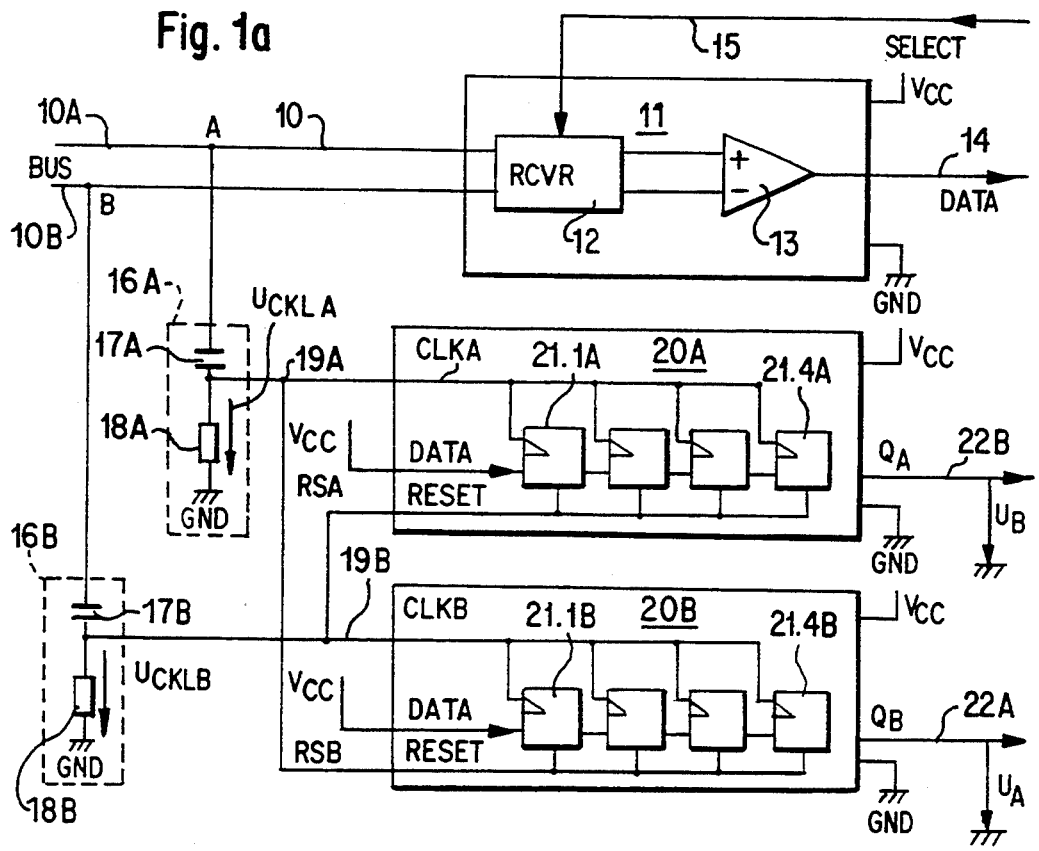
FIG. 1a shows a block diagram of the exemplary device for carrying out the method according to the invention.

FIG. 1a illustrates the environment within which the device according to the invention can be used. A symmetrical, serial bus line 10 has two wires 10A and 10b which normally can be operated in phase opposition with respect to one another. The bus 10 can be connected to a device 11 having a receiver 12 which can be activated via a SELECT line 15 and can relay for evaluation via a command path 14 data signals received via a single phase driver 13. Instead of a receiver, the receiver 12 could be a bus transceiver which can both receive data and drive the bus for data output and data input.

Two high-pass filters 16A and 16B are connected at coupling nodes A and B to the two wires 10A and 10B of the bus line 10. The coupling nodes A and B can be arranged with the two bus terminals of a bus receiver or bus transceiver as a component of the device 11 in an identical fashion and can also be on-chip on a corresponding integrated semiconductor circuit. The high-pass filters 16A and 16B can each consist of a coupling capacitor 17A and 17B, respectively, and a resistor 18A and 18B, respectively, connected in series to earth ground. It is therefore possible to tap voltages $U_{CKLA}$ and $U_{CKLB}$, at the resistors 18A and 18B, respectively.

Furthermore, two identical shift registers 20A and 20B are connected to earth ground and to a supply voltage $V_{CC}$. Each register 20A, 20B has a multiplicity of shift cells 21.1A–21.4A and 21.1B–21.4B. The serial data inputs DATA of the two shift registers are permanently connected to the potential $V_{CC}$(logic "H" level).

The clock input CLKA acting in parallel on the register cells 21.1A to 21.4A is connected to the output of the high-pass filter 16A assigned to the bus wire 10A. The connection is made at the tap 19A between the capacitor 17A and the earthing resistor 18A. The reset input RESET, acting in parallel on the register cells 21.1A to 21.4A of the shift register 20A is connected via a reset line RSA to the output of the high-pass filter 16B assigned to the bus wire 10B. The connection is made at to the tap 19B between the capacitor 17B and the resistor 18B.

The clock input CLKB acting in parallel on the register cells 21.1B to 21.4B is connected to the output of the high-pass filter 16B assigned to the bus wire 10B. The reset input RESET, acting in parallel on the register cells 21.1B to 21.4B, of the shift register 20B is connected via a reset line RSB to the output of the high-pass filter 16A assigned to the bus wire 10A.

The signal voltage $U_{CLKA}$ derived from the bus wire 10A by quasi-differentiation in the high-pass filter 16A is present at the shift register 20A as clock signal and at the shift register 20B as reset signal. Inversely, the signal voltage $U_{CLKB}$ derived from the bus wire 10B by quasi-differentiation in the high-pass filter 16B is present at the shift register 20B as clock signal and at the shift register 20A as reset signal. The serial output of the shift register 20A outputs the status signal UB for the bus wire 10B, and is therefore denoted by 22B. The serial output of the shift 5 register 20B outputs the status signal UA for the bus wire 10A and is therefore denoted by 22A.

Figure 1B:
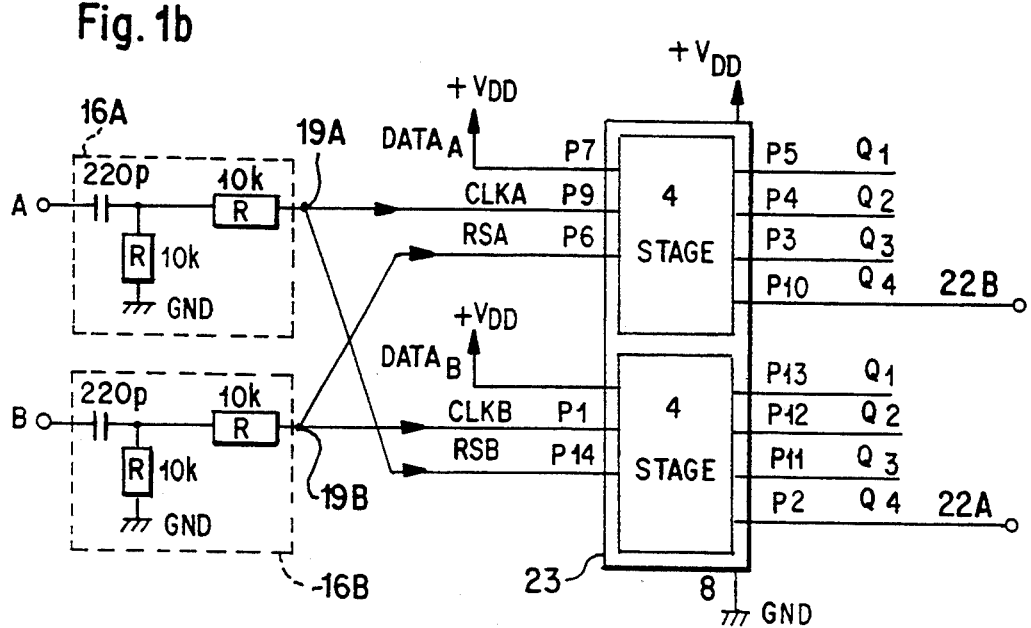

FIG. 1b illustrates a practical realization of a device as explained above. The two high pass filters 16A and 16B are designed here, too, as simple differentiating elements which are expanded by output resistors having 10 kΩ. The 10 kΩ resistors protect downstream modules against negative input pulses.

An integrated CMOS circuit, such as the known type CD 15 4015B, is provided here by way of example as a further component 23 and connected downstream of said high-pass filters 16A and 16B. The component 23 contains two mutually independent, four-stage shift registers. The register outputs $Q_{4A}$ and $Q_{4B}$ correspond to the outputs 22B and 22A, respectively, in FIG. 1a. The device has an extremely low subassembly cost.

Figure 2:
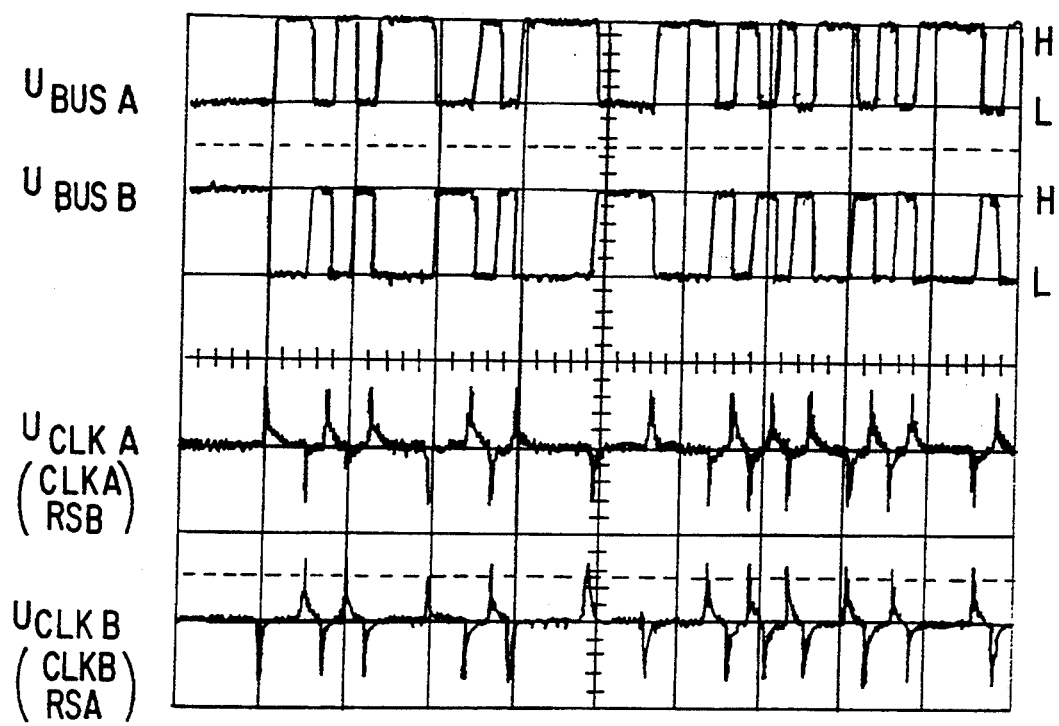
FIG. 2 show oscillogram of the bus wire potentials and of signal derivations obtained therefrom.
Figure 3:
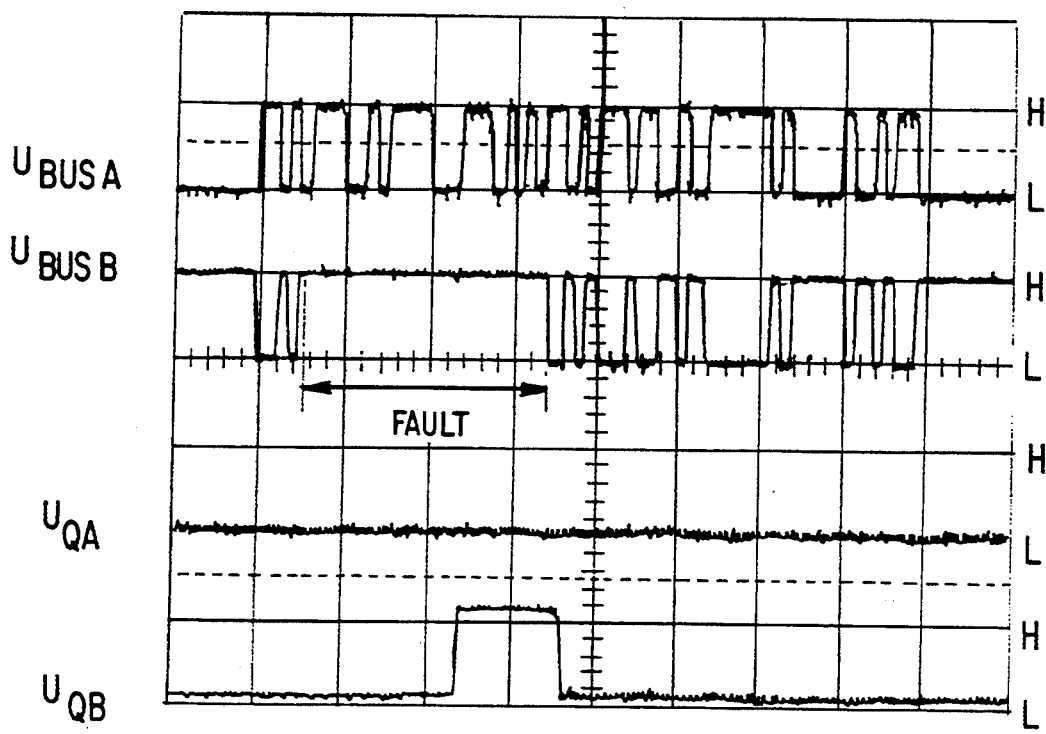
FIG. 3 shows oscillogram of the bus wire potentials and the fault status signals of the device in accordance with FIG. 1a, illustrating effects of a temporary high fault.
Figure 4:
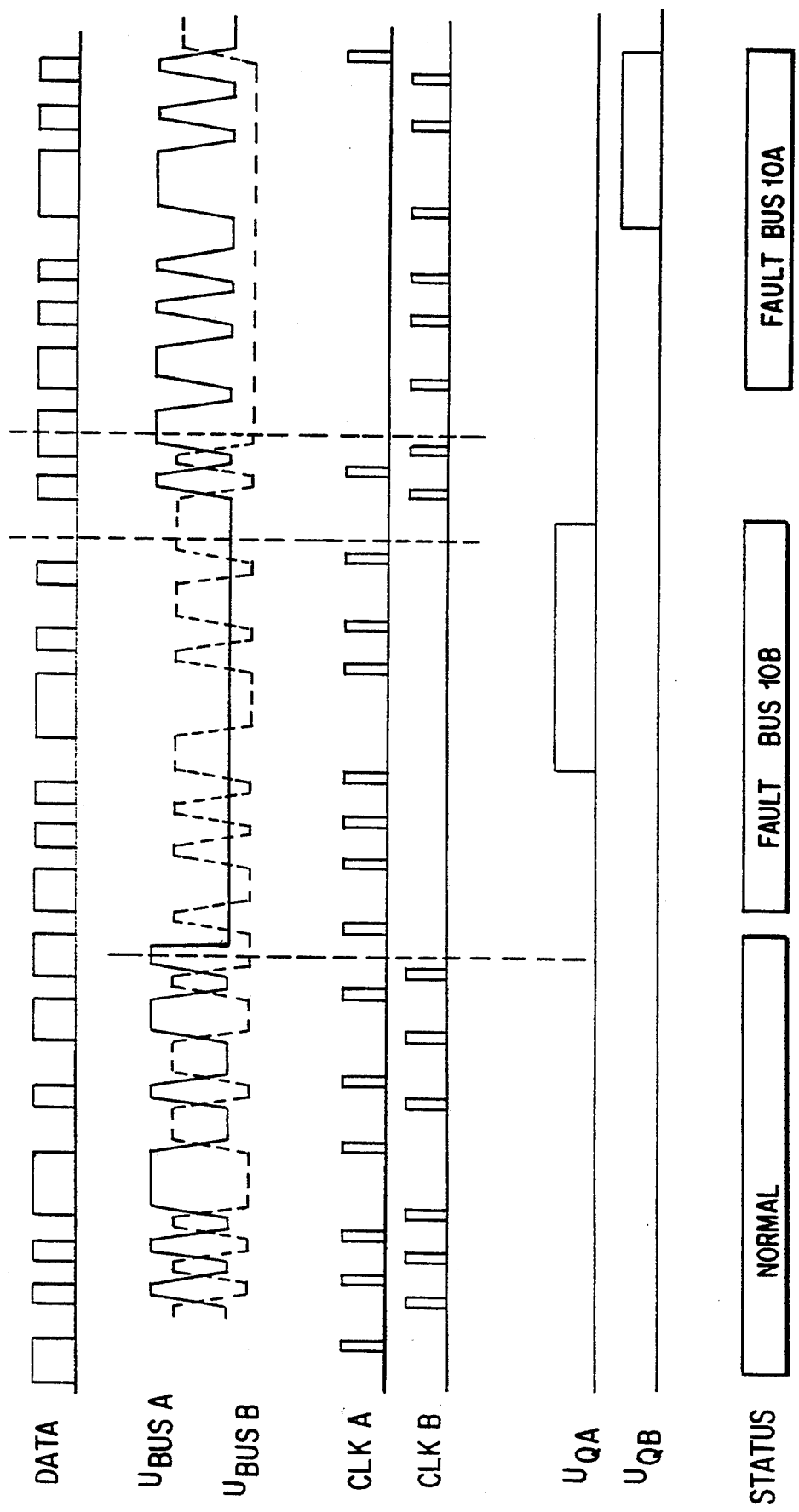
FIG. 4 shows a complex signal flow diagram to illustrate the method and the functioning of the device according to the invention.

The method of operation is illustrated with FIGS. 2 to 4. The oscillogram in accordance with FIG. 2 shows in the upper half the antiphase signal voltage curves $U_{BUSA}$ and $U_{BUSB}$ on the bus wires 10A and 10B without the presence of a fault. The correspondingly associated signal voltages $U_{CLKA}$ and $U_{CLKB}$ which are obtained by quasi-differentiation of the signal voltages UBUSA and UBUSB are represented in the lower half of the oscillogram.

The shift registers can be serially loaded and reset in parallel and have two multistep shift functions which are triggered by the positive pulses of the voltages $U_{CLKA}$ and $U_{CLKB}$. The negative signal components are suppressed at the inputs P1, P6, P9, P14 of the CMOS circuit 23, for example by means of the 10 kΩ output resistors connected upstream in FIG. 1b to the taps 19A and 19B and by means of substrate protective diodes which inhibit positive input voltages and conduct negative input voltages.

The fault-free state each leading edge of the bus wire voltage $U_{BUSA}$ effects a positive clock pulse $U_{CLKA}$ and each trailing edge of the bus wire voltage $U_{BUSB}$ is accompanied by a negative clock pulse $U_{CLKB}$. Inversely, each leading edge of the bus wire voltage $U_{BUSB}$ effects a positive clock pulse $U_{CLKB}$ and each trailing edge of the bus wire voltage $U_{BUSA}$ is accompanied by a negative clock pulse $U_{CLKA}$. Only the positive pulses are evaluated below. The $U_{CLKA}$ pulses are connected to the inputs CLKA and RSB, and the $U_{CLKA}$ pulses are connected to the inputs CLKB and RSA.

Each positive pulse UCLKA shifts the logic "H" level present at the data input DATA of the shift register 20A by one step to the next register cell. Since the signal $U_{CKLS}$ is simultaneously present at the reset input RESET of the shift register 20B, the signal simultaneously effects the parallel resetting of all the register cells of the shift register 20B to logic "L' level. Inversely, each positive clock pulse UCLKB shifts the logic "H" level present at the data input DATA of the shift register 20B by one step to the next register cell. Since the $U_{CLKB}$ signal is simultaneously present at the reset input RESET of the shift register 20A, the signal simultaneously effects the parallel resetting of all the register cells of the shift register 20A to logic "L" level.

Since complete symmetry is present, given a fault-free bus state, each pulse $U_{UCKA}$ and $U_{CLKB}$, respectively, to be assigned to a leading edge of $U_{BUSA}$ or $U_{BUSB}$ relative to the state "H" thus in each case resets the shift register 20B and 20A, respectively, assigned to the other bus wire in each case, so that the logic level "H" permanently present at the data inputs DATA can never appear at the output 22B of the shift register 20A, nor, respectively, the output 22A of the shift register 20B.

In FIG. 3, the effect of a bus fault is shown. After the second transition of $U_{BUSA}$ to the state "H" a so-called high-side short occurs at the bus wire 10B, so that the latter erroneously remains in the logic state "H" . The high-pass filter 16B thus no longer outputs pulses $U_{CLKBD}$, so that although the shift register 20A is clocked on by pulses $U_{CKLA}$ derived from the undisturbed signal voltage $U_{BUSA}$ and present at its input CLKA, the register 20A is no longer reset.

The result of this is that as a consequence of the fourth transition of the signal voltage $U_{BUSA}$ to the state "H", the status signal $U_{BD}$ at the output 22B of the shift register 20A is set from the state "L" (previously caused by the constant resetting) to the state "H" read in at the data input DATA four shift register clock pulses previously.

After removal of the bus fault on the bus wire 10B, the next transition of the signal voltage $U_{BUSB}$ to the state "H" at the output of the high-pass filter 16B already effects a corresponding pulse $U_{CLKB}$ which being present at the input RSA of the shift register 20A, resets all the register cells of the shift register 20A to logic "L" level, so that as a result the status signal $U_B$ also reassumes the logic level "L".

FIG. 4 illustrates diagrammatically with the example of alternating ground shorts on the bus wires 10A and 10B, which effect a clamping of corresponding signals $U_{BUSA}$ and $U_{BUSB}$ to "L" level, the status signals $U_A$ and $U_B$ indicate these fault states.

The number of cells per shift register determines more than the delay between the occurrence of a bus fault and its detection. The number of stages also determines the "tolerable" maximum duration (transitions from "L" to "H" on the bus) during which bus faults are allowed to be present without the occurrence of the fault status "H" of $U_A$ or $U_B$, respectively. This can be desirable, for example, in the application of bit-fault-tolerant communications protocols. In the example in accordance with FIGS. 1a and 1b with a number of cells of four, all bus faults lasting three or less transitions from "L" to "H" are thus not detected.

A short delay time is consequently achieved by a small number of register cells. This effects a short fault tolerance, that is to say, a suppression lasting only a few bus signal changes of the "H" state, identifying a bus fault, of the status signals $U_A$ or $U_B$. On the other hand, a larger number of register cells increases the tolerance of the device with respect to interference voltage peaks and interference pulses on the bus line.

The status signals $U_A$ and $U_B$ can, of course, be further processed in any desired way. For example, the status signals $U_A$ and $U_B$ can be used to generate alarm signals or to trigger the shutdown of a corresponding bus system. Since the disturbed bus wire is detected by the method, it is also possible, however, to take measures for the further operational readiness of the system, such as, for example, steps that are within the framework of a fail-safe mode per single-wire transmission.

A development of the device is possible by replacing the RC high-pass filters functioning as differentiating elements by edge-triggered timers, for example monostable multivibrators, which, in the event of corresponding triggering by "L"→"H" transitions or "H"→"L" transitions, generate pulses $U_{CKLS}$, and $U_{CKLB}$, of constant duration which are dimensioned to be shorter than the shortest repetition time of signal edges of the same direction on the bus wires. This permits in a particularly simple way the monolithic integration of a device thus modified together with other circuit functions.

The low cost of circuitry predestines the device according to the invention for monolithic realization in semiconductor bus modules such as, for example, receivers, transmitters, transceivers, bus controllers etc. In particular, the device can be designed and realized as a structurally defined, silicon-compilable standard cell, and be bound as such into the topology of a bus-oriented semiconductor circuit of any desired function produced using any desired technology.

In this context, it is possible to achieve high universality in such a standard cell by ensuring that the shift registers of a corresponding standard cell have at least one tap after at least a specific number of cells, and that the standard cell further comprises logic means which, as a function of a logic control signal which can be fed to these means, permit the effective length of the shift registers to be switched over in pairs in each case between at least two numbers of stages, and to this extent the bit depth of the fault tolerance of the device to be matched to the respective application.

The universality of such a standard cell can be still further enhanced by further providing additional means which, as a function of a logic control signal which can be fed to these means, permit the pulse response of pulse-weighing means 16A, 16B to be influenced, and thus the cutoff frequency of the device to be matched, for example, to the edge steepness of the bus signals.

Corresponding weighing means can, for example, be represented in a fashion greatly favoring integration by means of cascaded CMOS gate chains having partial or complete feedback. In this case, it is chiefly the technically conditioned gate propagation delays in the nanosecond range which are utilized to condition a pulse of specific duration. Since no or only very small capacitors are additionally required, the on-chip space requirement of such arrangements for pulse weighting is no larger than that for corresponding standard cell shift registers.

Figure 5:
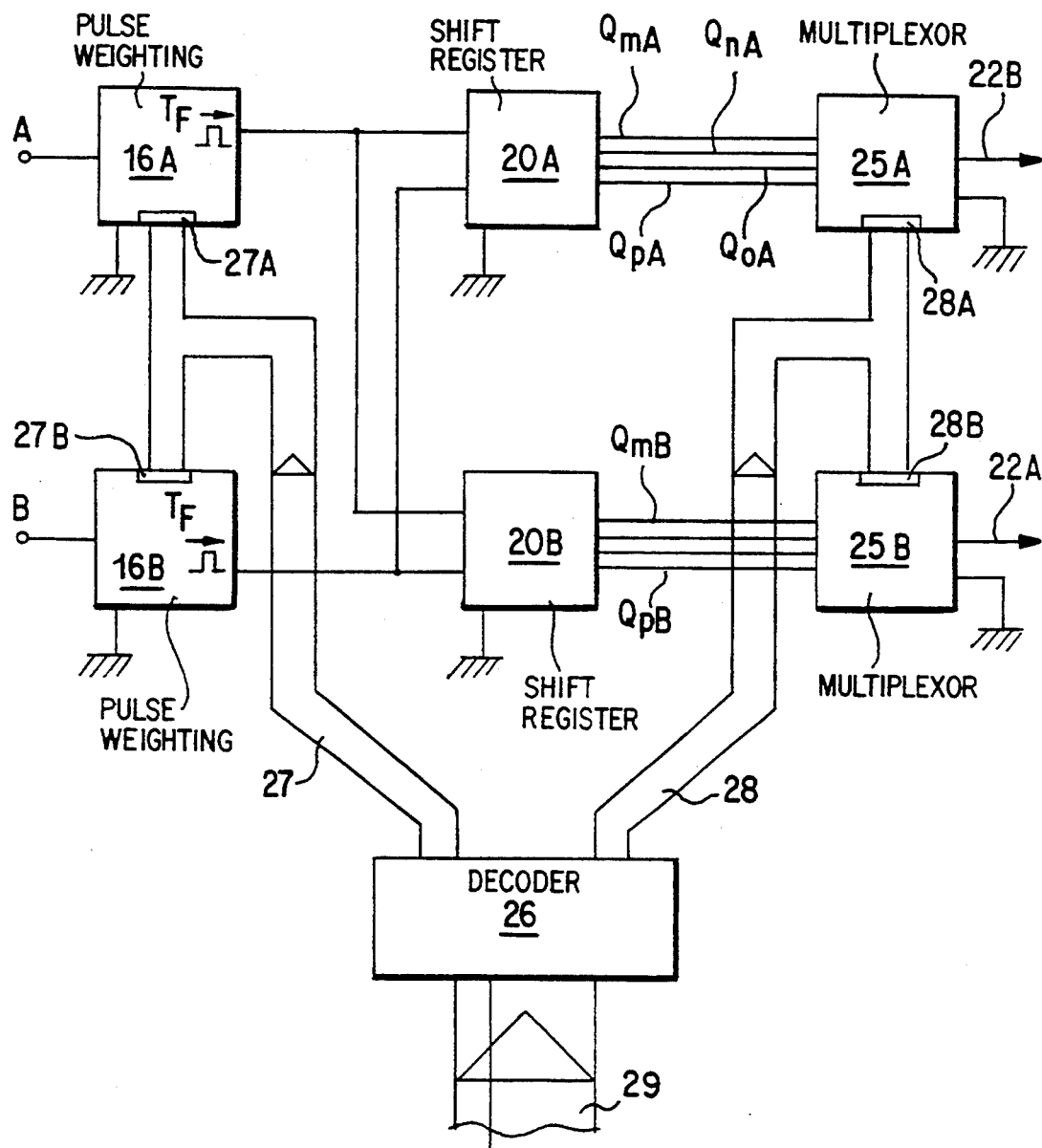
FIG. 5 shows the block diagram of a universal device, which is also suitable for bus testing, in the form of a silicon-compilable standard cell.

In accordance with FIG. 5, the two last mentioned developments can be realized preferably combined within the framework of a standard cell structure. Pulse-weighing stages 16A, 16B are programmable monostable multivibrators or timers of the aforementioned type made from cascaded CMOS gates which output to logic signal transitions of a specific direction of wire signals ($U_{BUSA}$, $U_{BUSB}$) individual pulses having a duration which can be varied depending on the driving of their programming inputs 27A and 27B. Appropriate CMOS gate cascades can be connected with negative feedback for temperature compensation in a manner familiar to the person skilled in the art.

Furthermore, connected downstream of the shift registers are multiplexors 25A and 25B, respectively, whose inputs are connected to shift register taps $Q_{mA}$ to $Q_{pA}$ and to $Q_{pB}$, respectively, and which are capable, depending on the driving of their select input 28A and 28B, respectively, of statically switching through in each case one shift register tap to their output 22B and 22A, respectively.

The control paths 27 and 28, which are, for example, only a few bits wide, for programming the pulseweighting stages 16A and 16B and the output multiplexors 25A and 25B, respectively, can have a logic setting signal applied directly or via a latch arrangement or a decoder 26. In this case, such a latch arrangement or a decoder 26 can be designed for receiving a parallel or serial setting word via the input path 29. That is to say a serial/parallel design can also contain a shift register as a serial/parallel transducer. For a specific application, the input path 29 can be permanently connected to a corresponding setting signal. It is possible for such a setting signal to be generated at the time on-chip or by permanent wiring of external IC terminals (i.e., wired programming).

For test purposes, the setting signal can be varied, for example by the on-chip computer of the bus circuit on whose chip the standard cell is co-integrated. Consequently, the cutoff frequency and fault tolerance depth of bit signals on the bus line can be varied for the purpose of providing a test filtering function. Thanks to the transmissibility of test results via the bus, such a universal standard cell permits the realization of a decentralized bus test system resolved to form a network which is suitable not only for determining the disturbed bus wires, but also, furthermore, to limit the site of a bus fault.

Figure 6:
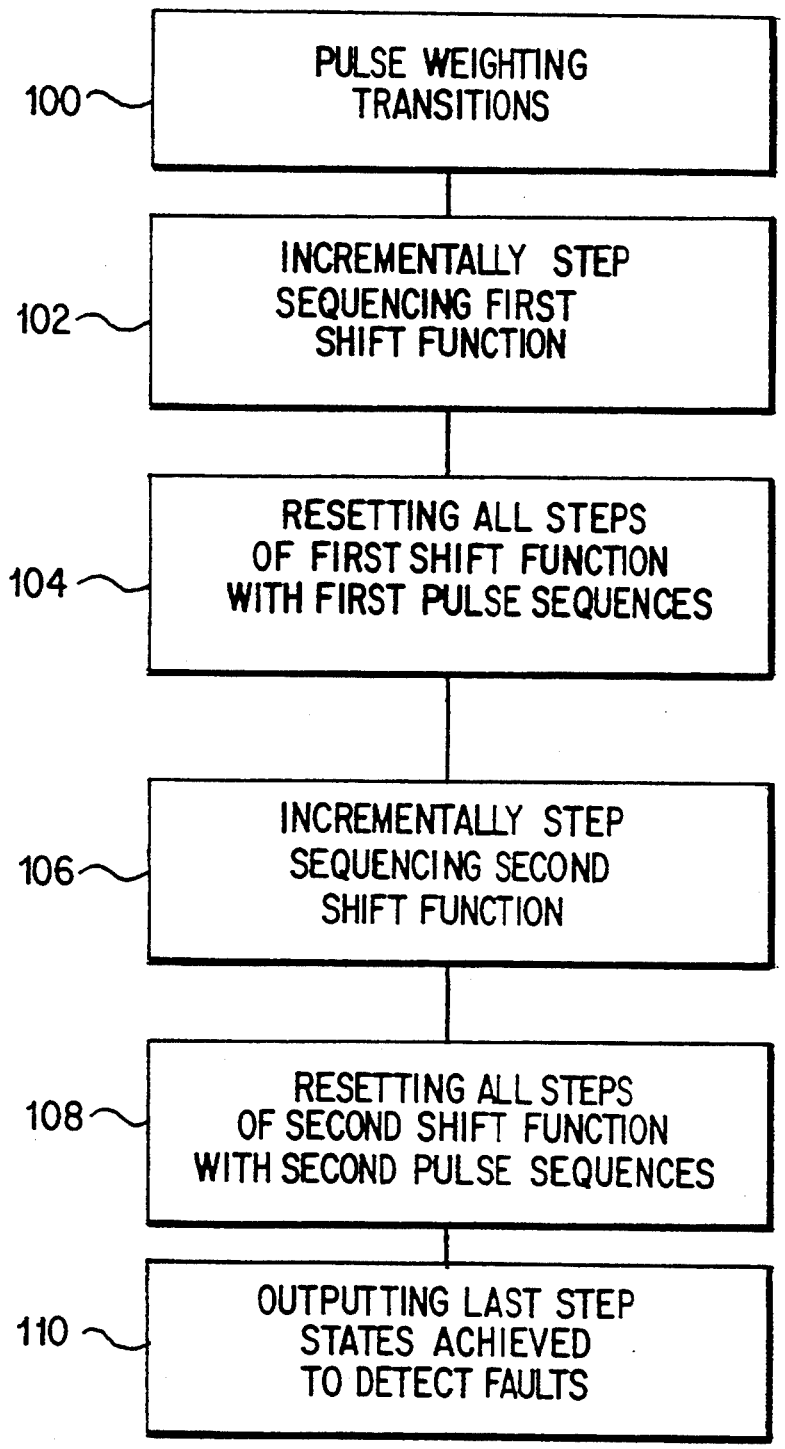
FIG. 6 is a flow chart illustrating the operation of the method of the present invention.

The preceding functional description of the device discloses the method according to the invention for monitoring bus faults on symmetrical two-wire bus lines. These steps, as shown in FIG. 6, include pulse weighting of the "L"→"H" transitions or "H"→"L" transitions of the first and the second wire signal of a two-wire bus line by transition-concatenated derivation of first and second pulse sequences (step 100), incremental step sequencing of a first multistep shift function, which in this case can be serially loaded with a constant logic state, in accordance with the pulse sequences, derived from the first bus line, as step commands (step 102), all-step resetting of the first multistep shift function in accordance with the pulse sequences, derived from the second bus line, as reset commands (step 104), incremental step sequencing of a similar second multistep shift function, which in this case can be serially loaded with a constant logic state, in accordance with the pulse sequences, derived from the second bus line, as step commands (step 106), all-step resetting of the second multistep shift function in accordance with the pulse sequences, derived from the first bus wire, as reset commands (step 108), and outputting the step states last achieved in each case of the first and second multistep shift functions as signals characterizing the respective fault state of the respective other bus line wire. The method according to the invention can be a method by alternative steps such as generating first and second pulse sequences by differentiating the wire signals, generating first and second pulse sequences by high pass filtering of the bus wire signals, generating first and second pulse sequences by detecting similar logic transitions of the first and second wire signals and generating first and second pulse sequences by triggering, as a function of the detection of said transitions, first and second individual pulses of predetermined duration per detection event.

For the purpose of matching or optimizing monitoring parameters to a specific application, or for the purpose of testing two-wire buses, the method according to the invention can be still further augmented by one of the steps of identical variation in the effectively active number of steps of the first and second multistep shift function in accordance with step states, last achieved in each case by a logic setting signal (via 28) and evaluation, of first and second multistep shift functions, as a function of the setting signal or identical variation in the duration of said individual pulses of first and second pulse sequences in accordance with step states, last achieved in each case by a logic setting signal (via 27) and evaluation, of first and second multistep shift functions, as a function of the setting signal.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for detecting fault states in symmetrical two-wire bus lines having first and second line wires and for detecting fault states in two-wire bus interfaces for serial data transmission, the line wires being driven in phase opposition, the method comprising the following steps:

pulse weighting of low to high transitions or high to low transitions of first and second wire signals of the first and second line wires by transition-concatenated derivation of first and second pulse sequences;

incremental step sequencing with a constant logic input state a first multistep shift function in accordance with the first pulse sequences which are derived from the first line wire as step commands;

resetting all of the steps of the first multistep shift function in accordance with the second pulse sequences which are derived from the second line wire as reset commands;

incremental step sequencing with a constant logic input state of a second multistep shift function in accordance with the second pulse sequences which are derived from the second line wire as step commands;

resetting all of the steps of the second multistep shift function in accordance with the first pulse sequences which are derived from the first line wire as reset commands; and outputting step states last achieved for each of the first and second multistep shifts functions wherein the first multistep shift function detects fault states of the second line wire by determining a high state output and the second multistep shift function detects fault states of the first line wire by determining a high state output.

2. The method according to claim 1, further comprising the step of:
generating the first and second pulse sequences by differentiating signals from said first and second line wires, respectively.

3. The method according to claim 1, further comprising the step of:
generating the first and second pulse sequences by high-pass filtering signals from said first and second line wires.

4. The method according to claim 1, further comprising the steps of:
detecting similar logic transitions of signals from said first and second line wires; and
generating the first and second pulse sequences by triggering, as a function of the detection of said transitions, first and second individual pulses of predetermined duration per detection event.

5. The method according to claim 1, further comprising the steps of:
identically varying an effectively active number of steps of the first and second multistep shift functions in accordance with step states, last achieved in each case by a logic setting signal; and
evaluating the first and second multistep shift functions as a function of the logic setting signal.

6. The method according to claim 4, further comprising the step of:
identically varying duration of said individual pulses of the first and second pulse sequences in accordance with step states, last achieved in each case by a logic setting signal and evaluation, of first and second multistep shift functions, as a function of the logic setting signal.

7. An apparatus for detecting fault states in symmetrical two-wire bus lines and two-wire serial interfaces for serial data transmission, comprising:
first and second means, coupled to first and second bus wires, for outputting first and second pulses, respectively, in response to each logic signal transition of a specific direction of first and second wire signals;
first and second shift registers which are configured to be serially loaded, clocked and reset in parallel and serially output, the first and second shift registers having first and second loading inputs, clock inputs, reset inputs and readout outputs, the serial loading inputs of the first and second shift registers being connected to a constant logic level, wherein the first means is operationally connected to the clock input of the first shift register and to the reset input of the second shift register, and the second means is operationally connected to the clock input of the second shift register and to the reset input of the first shift register, wherein the output of the first shift register indicates a fault status signal on the second bus wire by a high state, and the output of the second shift register indicates a fault status signal on the first bus wire by a high state.

8. The apparatus according to claim 7, wherein the first and second means coupled to the first and second bus wires are differentiating elements, and the first and second shift registers are formed in a single integrated logic circuit.

9. The apparatus according to claim 7, wherein the first and second means coupled to the first and second bus wires are high-pass filters, and the two shift registers are formed in a single integrated logic circuit.

10. The apparatus according to claim 7, wherein the first and second means coupled to the first and second bus wires are edge-selectively triggerably timers.

11. The apparatus according to claim 10 wherein the timers are nonstable multivibrators.

12. The apparatus according to claim 7, wherein the apparatus is integrated in a single logic circuit using monolithic circuit technology.

13. The apparatus according to claim 7, wherein the apparatus is integrated on a semiconductor chip together with at least one monlithically realized bus function.

14. The apparatus according to claim 12, wherein the apparatus is a structurally defined, silicon-based standard cell, and is formed in a topology of a bus-oriented semiconductor circuit.

15. The apparatus according to claim 14, wherein the first and second shift registers of the standard cell have at least one tap after at least a specific number of cells, and the silicon based standard cell comprises a second logic means which, as a function of a logic control signal which is fed to the first and second logic means, permit an effective length of the first and second shift registers to be switched over between at least two numbers of stages in each case, and a fault tolerance width is configured to be matched to at least one of an application and an interference situation of the apparatus.

16. The apparatus according to claim 14, wherein the silicon based standard cell comprises a second logic means which, as a function of a logic control signal which is fed to first and second logic means, permit a duration of the pulses generated by the first and second means to be influenced, whereby a cutoff frequency of the apparatus is matched to an edge steepness according to one or more of an application, a bit duration of normal bus signals, and a specific bus test signal.

17. The apparatus according to claim 16, wherein the first and second means comprise cascaded CMOS gates having a stage of the cascade output which is selected as a function of said logic control signal.

* * * * *